United States Patent
Hanami

(10) Patent No.: US 9,545,824 B2
(45) Date of Patent: Jan. 17, 2017

(54) PNEUMATIC TIRE

(75) Inventor: Keiichi Hanami, Kunitachi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 116 days.

(21) Appl. No.: 13/984,720

(22) PCT Filed: Feb. 10, 2012

(86) PCT No.: PCT/JP2012/000921
§ 371 (c)(1),
(2), (4) Date: Aug. 9, 2013

(87) PCT Pub. No.: WO2012/111297
PCT Pub. Date: Aug. 23, 2012

(65) Prior Publication Data
US 2013/0312889 A1 Nov. 28, 2013

(30) Foreign Application Priority Data
Feb. 16, 2011 (JP) ................................. 2011-031113

(51) Int. Cl.
B60C 11/13 (2006.01)
B60C 11/11 (2006.01)

(52) U.S. Cl.
CPC ............ B60C 11/11 (2013.01); B60C 11/1384 (2013.04); B60C 11/1392 (2013.04); B60C 2011/1338 (2013.04)

(58) Field of Classification Search
CPC .. B60C 11/11; B60C 11/1376; B60C 11/1384; B60C 11/1392
See application file for complete search history.

(56) References Cited

U.S. PATENT DOCUMENTS

| 4,383,568 A | * | 5/1983 | Pieper ..................... B60C 11/11 152/209.18 |
| 5,031,680 A | * | 7/1991 | Kajikawa et al. ........ 152/209.18 |
| 5,957,180 A | * | 9/1999 | Kuramochi et al. ..... 152/209.21 |

(Continued)

FOREIGN PATENT DOCUMENTS

| EP | 0393873 | * 10/1990 |
| EP | 2048007 A1 | 4/2009 |

(Continued)

OTHER PUBLICATIONS

English machine translation of JP09-300915, dated Nov. 1997.*

(Continued)

Primary Examiner — Steven D Maki
Assistant Examiner — Robert Dye
(74) Attorney, Agent, or Firm — Sughrue Mion, PLLC

(57) ABSTRACT

A pneumatic tire includes, on a tread surface (1) of the tire, at least two longitudinal grooves (2, 3) extending along a tire equator (C), a plurality of transverse grooves (4a to 4d) connecting the longitudinal grooves, and a block row (L5) formed by a plurality of blocks (5a to 5d) extending along the tire equator and defined by the longitudinal grooves and the transverse grooves. Each of the blocks (5a to 5d) includes a reduced thickness portion (6) in an overlapping region (R) where the blocks overlap in projection when the block row (L5) is projected in the circumferential direction, the reduced thickness portion (6) including at least two portions where the thickness of the block gradually decreases.

8 Claims, 5 Drawing Sheets

(56) References Cited

U.S. PATENT DOCUMENTS

| | | | | |
|---|---|---|---|---|
| 6,105,643 | A * | 8/2000 | Rohweder | B60C 11/0309 152/209.21 |
| 6,530,405 | B1 * | 3/2003 | Brown | B60C 11/01 152/209.16 |
| 6,983,777 | B2 * | 1/2006 | Ratliff, Jr. | B60C 11/0302 152/209.15 |
| 7,438,101 | B2 * | 10/2008 | Shirouzu | 152/209.15 |
| 2006/0108040 | A1 | 5/2006 | Miyazaki | |
| 2007/0006955 | A1 * | 1/2007 | Fukunaga | 152/209.24 |
| 2007/0246142 | A1 * | 10/2007 | Ishiyama | B60C 11/0332 152/548 |
| 2009/0320982 | A1 * | 12/2009 | Ochi | B60C 11/0306 152/209.25 |
| 2010/0236679 | A1 | 9/2010 | Miyazaki | |

FOREIGN PATENT DOCUMENTS

| | | | |
|---|---|---|---|
| JP | 09142105 A | | 6/1997 |
| JP | 09-300915 | * | 11/1997 |
| JP | 2003-72318 A | | 3/2003 |
| JP | 2006-150991 A | | 6/2006 |
| JP | 2006-151173 A | | 6/2006 |
| JP | 2009-113617 A | | 5/2009 |
| JP | 2010-208419 A | | 9/2010 |

OTHER PUBLICATIONS

Communication dated Dec. 2, 2014, issued by the Japanese Patent Office in counterpart Application No. 2011031113.

International Search Report for PCT/JP2012/000921 dated May 15, 2012.

Communication dated Feb. 16, 2015 from the State Intellectual Property Office of People's Republic of China in counterpart Application No. 201280009103.3.

Communication dated May 7, 2015, issued by the Australian Patent Office in counterpart Australian application No. 2012218994.

Communication dated Jul. 24, 2015, issued by the Australian Intellectual Property Office in corresponding Australian Application No. 2012218994.

Communication dated Oct. 12, 2015, issued by the State Intellectual Property Office of the P.R.C. in corresponding Chinese Application No. 201280009103.3.

* cited by examiner

| | Inventive Example 1 | Inventive Example 2 | Inventive Example 3 | Inventive Example 4 | Inventive Example 5 | Conventional Example | Comparative Example 1 |
|---|---|---|---|---|---|---|---|
| Overlapping | Yes | Yes | Yes | Yes | Yes | No | Yes |
| Number of steps in reduced thickness portion | Two steps | Two steps | Two steps | Two steps | Two steps | One step | One step |
| Shape of gradual decrease in reduced thickness | Level gradual decrease | Shape protruding towards groove bottom | Level gradual decrease | Level gradual decrease | Level gradual decrease | Level | Level gradual decrease |
| Negative ratio | 61.8 | 61.8 | 61.8 | 61.8 | 61.8 | 61.8 | 61.8 |
| Length $y_2$ in tire width direction of second step $6b_2$/tread ground contact width TW (%) | 0.2 (%) | 0.2 (%) | 0.2 (%) | 0.2 (%) | 0.2 (%) | - | - |
| Length $y_1$ in tire width direction of first step $6b_1$/tread ground contact width TW (%) | 4.1 (%) | 4.1 (%) | 4.1 (%) | 2 (%) | 6 (%) | -0.2 (%) | 4.1 (%) |
| x1 (mm) | 22.5 | 22.5 | 22.5 | 22.5 | 22.5 | 22.5 | 22.5 |
| x2 (mm) | 4 | 4 | 22.5 | 9.7 | 1.5 | 15.5 | 4 |
| x3 (mm) | 22.5 | 22.5 | 22.5 | 22.5 | 22.5 | 22.5 | 22.5 |
| x4 (mm) | 3 | 3 | 13.5 | 3 | 3 | - | - |
| x5 (mm) | 13.5 | 13.5 | 13.5 | 13.5 | 13.5 | - | - |
| x6 (mm) | 22.5 | 22.5 | 22.5 | 22.5 | 22.5 | - | - |
| Block shape when viewed projected in tire circumferential direction | | | | | | | |
| Traction performance | 114 | 121 | 112 | 112 | 117 | 100 | 109 |
| Groove volume (equals water drainage) | 105 | 107 | 100 | 107 | 104 | 100 | 93 |

PNEUMATIC TIRE

CROSS REFERENCE TO RELATED APPLICATIONS

This application is a National Stage of International Application No. PCT/JP2012/000921 filed Feb. 10, 2012, claiming priority based on Japanese Patent Application No. 2011-031113 filed Feb. 16, 2011, the contents of all of which are incorporated herein by reference in their entirety.

TECHNICAL FIELD

The present invention relates to a pneumatic tire that maintains good mud drainage while also achieving good traction performance without a loss of block rigidity.

BACKGROUND ART

Conventionally, among pneumatic tires focusing on rough-road use, in particular pneumatic tires to be driven in muddy areas, the groove width and groove depth are increased in order to ensure mud drainage, for example as in PTL 1 (JP2003-072318A). Thus increasing the groove volume prevents relatively sticky mud from accumulating within the grooves and allows for improved mud drainage.

CITATION LIST

Patent Literature

PTL 1: JP2003-072318A

SUMMARY OF INVENTION

When increasing the groove width and groove depth as above in order to ensure mud drainage, the blocks become smaller, which may cause the block rigidity to decrease. Accordingly, when increasing the groove width and groove thickness, it is necessary to ensure block rigidity by increasing the size of each block. When increasing the size of the blocks, however, the edge component due to the blocks decreases, leading in turn to a decrease in traction performance. It has thus been difficult to maintain both mud drainage and traction performance to a good degree simultaneously.

Accordingly, it is an object of the present invention to propose a pneumatic tire that can simultaneously achieve a high level of both mud drainage and traction performance.

The inventor intensely studied how to provide a pneumatic tire such that even when the tire has sufficient groove volume to ensure mud drainage, the tire does not suffer a decrease in block rigidity and has good traction performance, in particular good traction performance on muddy roads.

As a result, the inventor discovered that adopting a block arrangement such that blocks forming a block row within the tread surface overlap when the block row is projected in the tire circumferential direction increases the edge component due to the blocks while improving block rigidity. The inventor further discovered that at this point, providing the blocks with a reduced thickness portion in which the thickness decreases stepwise in an overlapping region in which the blocks overlap in projection, and having the reduced thickness portion include a portion in which thickness of the block gradually decreases, maintains high block rigidity while simultaneously ensuring sufficient groove volume for draining mud, thereby completing the present invention.

In other words, a summary of the present invention is as follows.

1. A pneumatic tire comprising, on a tire tread surface, at least two longitudinal grooves extending along a tire equator, a plurality of transverse grooves connecting the longitudinal grooves, and a block row formed by a plurality of blocks extending along the tire equator and defined by the longitudinal grooves and the transverse grooves, wherein each block includes a reduced thickness portion in an overlapping region where the blocks overlap in projection when the block row is projected in a circumferential direction, the reduced thickness portion including at least two portions where a thickness of the block gradually decreases.

2. The pneumatic tire according to 1, wherein the reduced thickness portion includes a plurality of steps, the thickness of the block differing at each step, and a step at a groove bottom of the longitudinal grooves or of the transverse grooves is a curved surface convexly protruding from a tread surface side of the block towards the groove bottom.

3. The pneumatic tire according to 1 or 2, wherein the reduced thickness portion includes a plurality of steps, the thickness of the block differing at each step, and in each step a length in a tire circumferential direction at a block interior is greater than a length in the tire circumferential direction at a block edge.

4. The pneumatic tire according to any one of 1 through 3, wherein the reduced thickness portion includes a plurality of steps, the thickness of the block differing at each step, and in a step closest to a groove bottom among the steps, a length in a tire width direction from a plane to an edge of the step is from 2% to 10% of a tread ground contact width, the plane traversing a tire width direction center of the overlapping region and being parallel to the tire equator.

According to the present invention, it is possible to provide a pneumatic tire that simultaneously achieves good mud drainage and good traction performance during rough-road use, in particular when driving on muddy roads.

BRIEF DESCRIPTION OF DRAWINGS

The present invention will be further described below with reference to the accompanying drawings, wherein:

FIG. 4 is a modification to the reduced thickness portion 6b in FIG. 3, wherein FIG. 4(a) illustrates the block 5b viewed projected in the tire circumferential direction, and FIGS. 4(b) and 4(c) are perspective views of two examples of the block 5b; and FIG. 5 is a table of traction performances of example tires according to the present invention, a conventional tire, and a comparative example tire.

DESCRIPTION OF EMBODIMENTS

With reference to the drawings, the following describes a pneumatic tire according to the present invention in detail.

Figure 1:
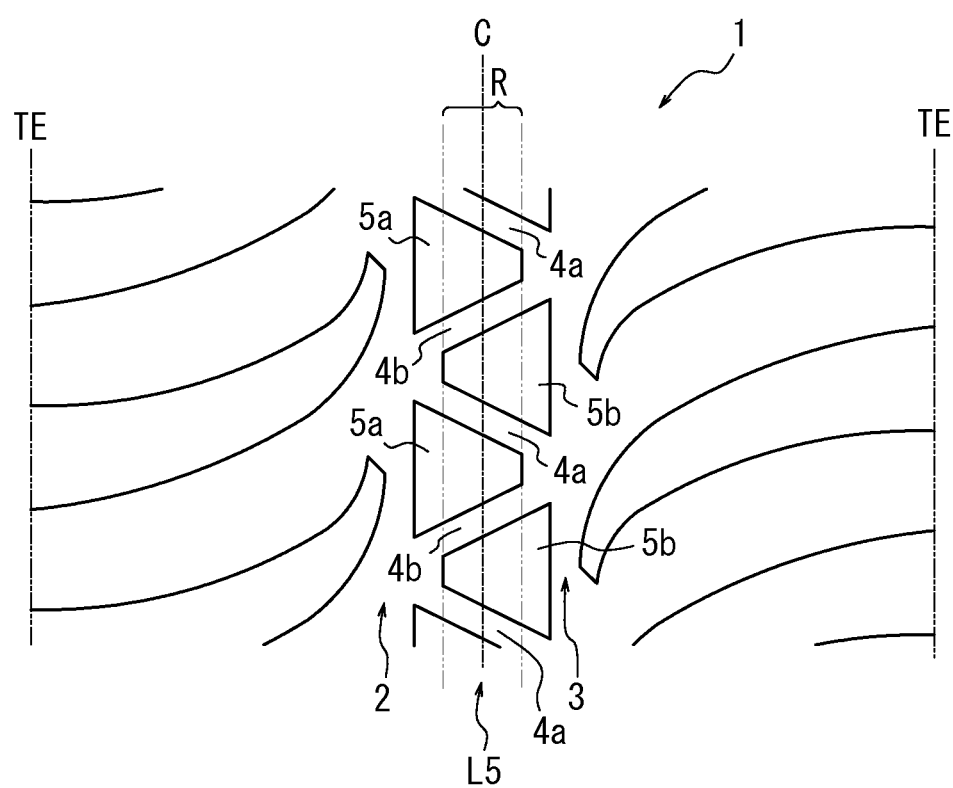
FIG. 1 is a partial development view of a tread surface of a pneumatic tire according to the present invention.
Figure 2:
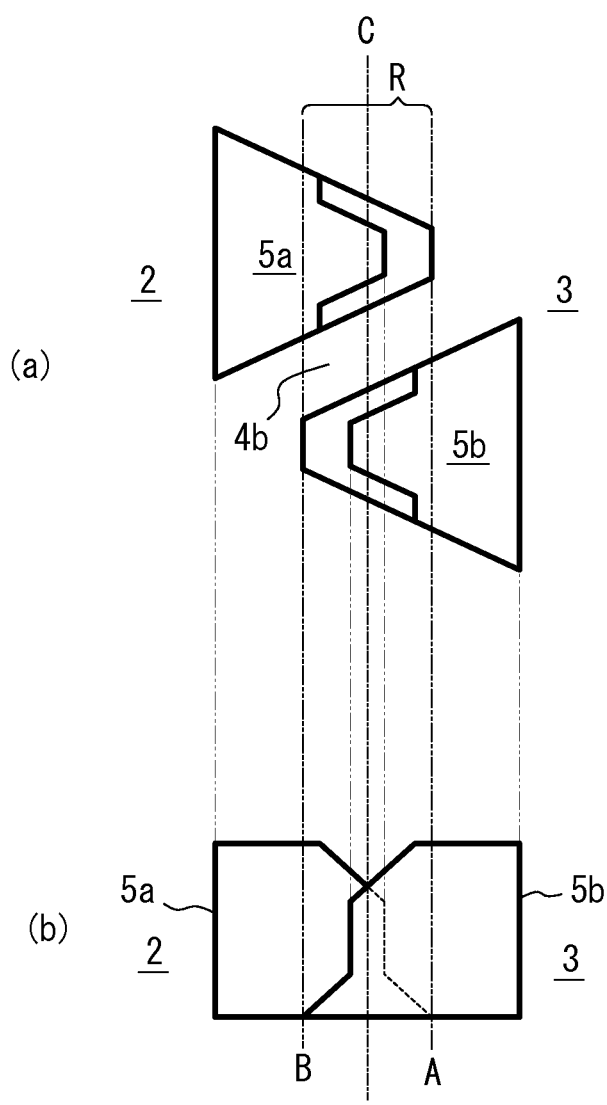
FIG. 2(a) is an enlargement of blocks 5a and 5b in FIG. 1.
FIG. 2(b) illustrates the relationship between blocks 5a and 5b when the blocks are viewed projected in the tire circumferential direction.
Figure 3:
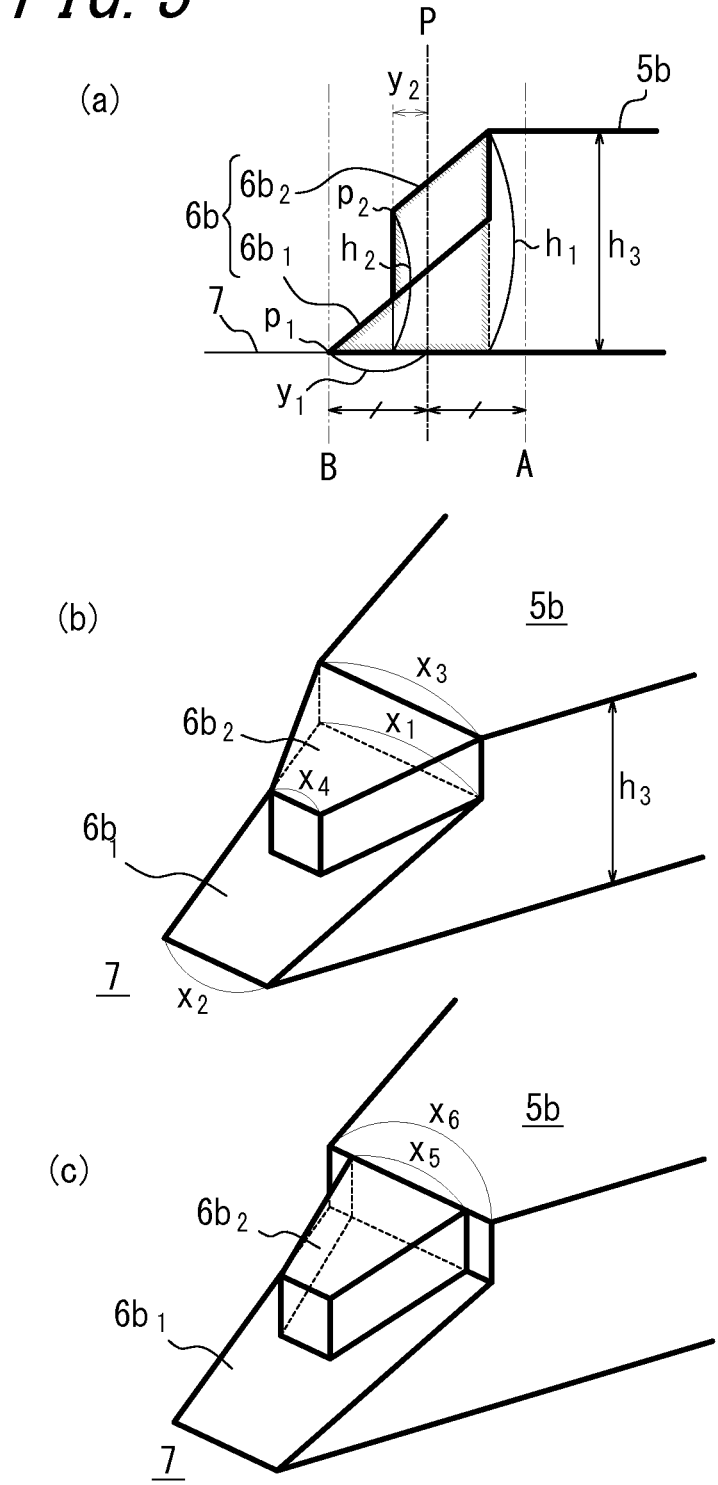
FIG. 3(a) illustrates a reduced thickness portion 6b in FIG. 2(b) when viewed projected in the tire circumferential direction.
FIGS. 3(b) and 3(c) are perspective views of two examples of the block 5b illustrated in FIG. 3(a)
Figure 4:
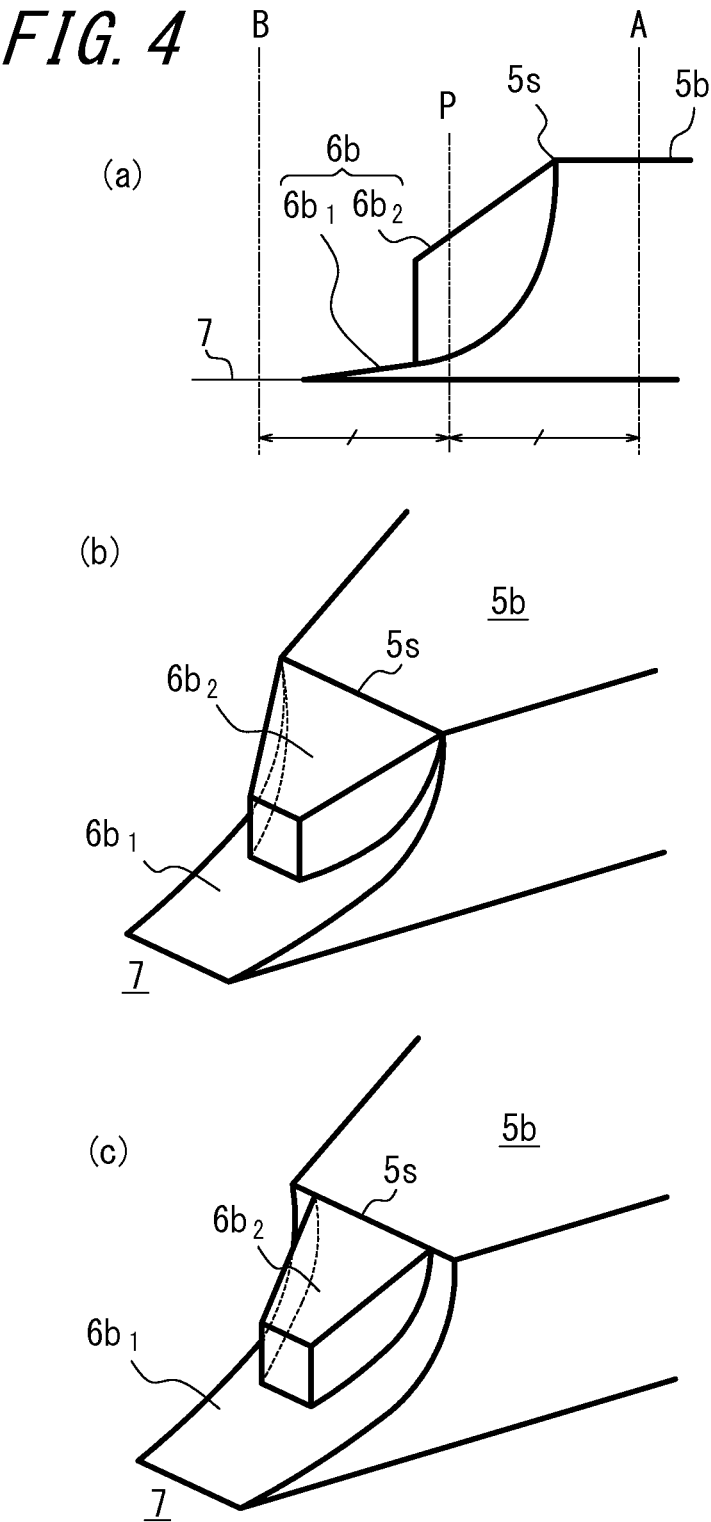

FIG. 1 is a partial development view of a tread surface of a pneumatic tire according to the present invention. FIG. 2(a) is an enlargement of blocks 5a and 5b in FIG. 1, and FIG. 2(b) illustrates the relationship between blocks 5a and 5b when the blocks are viewed projected in the tire circumferential direction. FIG. 3(a) illustrates the reduced thickness portion 6b in FIG. 2(b) when viewed projected in the tire circumferential direction. FIGS. 3(b) and 3(c) are perspective views of two examples of the block 5b illustrated in FIG. 3(a). FIG. 4 is a modification to the reduced thickness portion 6b in FIG. 3. FIG. 4(a) illustrates the block 5b viewed projected in the tire circumferential direction, and FIGS. 4(b) and 4(c) are perspective views of two examples of the block 5b.

As illustrated in FIG. 1, a pneumatic tire according to the present invention (hereinafter simply referred to as a "tire") includes, on a tread surface 1, at least two longitudinal grooves extending along a tire equator C, here longitudinal grooves 2 and 3, a plurality of transverse grooves connecting the longitudinal grooves, here a plurality of transverse grooves 4a and 4b that connect the longitudinal grooves 2 and 3 and are inclined with respect to the tire width direction, and a plurality of blocks, here blocks 5a and 5b, defined by the longitudinal grooves 2 and 3 and the transverse grooves 4a and 4b. The plurality of blocks 5a and 5b are arranged along the tire equator C to form a block row L5.

Here, the tread surface refers to the tire surface in contact with the ground when a tire is mounted on a standard rim of applicable size according to valid industrial standards for the region in which the tire is produced or used, the maximum load (maximum load capability) for a single wheel of applicable size according to the same standards is applied, and air pressure corresponding to the maximum load is applied. The standards are, for example, listed in the "Year Book" of The Tire and Rim Association, Inc. in the United States of America, the "Standard Manual" of The European Tyre and Rim Technical Organisation in Europe, or the "JATMA Year Book" of the Japan Automobile Tire Manufacturers Association in Japan.

In the present invention, it is crucial that when the block row L5 is viewed projected in the tire circumferential direction, the blocks 5a and 5b be arranged to include an overlapping region R where the blocks overlap in projection.

In other words, as representatively illustrated by the block 5a and block 5b in FIG. 2(b), the overlapping region R where the blocks 5a and 5b overlap in projection when the blocks are projected in the tire circumferential direction is the portion of each block located in a region between a plane A and a plane B, the plane A traversing a block tire width direction edge of the block 5a on the side of the longitudinal groove 3 and being parallel to the tire equator C, and the plane B traversing a block tire width direction edge of the block 5b on the side of the longitudinal groove 2 and being parallel to the tire equator C.

In this way, by including the overlapping region R where the blocks overlap in projection when viewed in the circumferential direction, the edge component due to the blocks increases and allows for improved traction performance. In other words, since the blocks 5a and 5b are arranged along the same circumferential line in the plane A and the plane B, traction performance can be improved by increasing the contact area between the blocks and the road surface and increasing the number of contact blocks.

Here, within the tread ground contact region, the center region of the tread width direction center of the tire is a region in which the tire ground contact length in the tire circumferential direction is long and in which traction is most effective. Accordingly, placing the block row L5 in the center region, as illustrated in FIG. 1, allows for a more effective increase in traction performance.

Note that in FIG. 1, the block row L5 is provided in the center region of the tread ground contact region so that the blocks sandwich the tire equator C, yet apart from the center region, a block row may be provided in another region as well to yield a plurality of block rows, or the block row L5 itself may be provided in a region other than the center region of the tread ground contact region.

Next, FIG. 3(a) illustrates the block 5b in FIG. 2(b) when viewed projected in the tire circumferential direction.

In the present invention, it is crucial that the blocks 5a and 5b forming the block row L5 have, in the overlapping region R, reduced thickness portions 6a and 6b that include at least two portions where the thickness of the block gradually decreases. As illustrated in FIG. 3(a), the block 5b has a reduced thickness portion 6b in the overlapping region R (portion surrounded by diagonal lines). This reduced thickness portion 6b includes at least two portions that gradually decrease from the plane A side to the plane B side. In the example illustrated in FIG. 3(a), the reduced thickness portion 6b includes a stepped shape with two steps.

In this way, in the overlapping region R where the blocks overlap in projection when the block row L5 is projected in the circumferential direction, the block 5b has a portion in which the thickness of the block decreases stepwise, thereby ensuring a volume of the grooves 4a and 4b equivalent to the amount of reduced thickness of the block. As a result, mud drainage can be improved.

At this point, by reducing the thickness of the block stepwise, sufficient groove volume for mud drainage can be ensured while simultaneously maintaining high block rigidity. In greater detail, within the reduced thickness portion 6b, the block is relatively thick on the plane A side, yet the block has a shape that is thinner by one step on the plane B side. Therefore, a high block rigidity close to that of the block portion with a thickness of $h_3$ is achieved at the plane A side of the reduced thickness portion, whereas the block thickness is dramatically reduced at the plane B side of the reduced thickness portion, thereby greatly contributing to sufficiently ensuring groove volume.

In the example illustrated in FIG. 3(a), among the blocks 5a and 5b forming the block row, the reduced thickness portion 6b in the overlapping region R of the block 5b is shown and described, yet the same structure and effects as above can be obtained for the block 5a. Specifically, while not illustrated in FIG. 3, the block 5a has a reduced thickness portion 6a in the overlapping region R, and the reduced thickness portion 6a has a shape including at least two portions that gradually decrease from the plane B side to the plane A side, for example a stepped shape with two steps.

In the example illustrated in FIG. 3(a), the reduced thickness portion that includes at least two portions that gradually decrease is illustrated as a stepped shape with two steps, yet the block thickness may be further reducing by adopting three or more steps.

Furthermore, as described above, in the present invention it is crucial that the reduced thickness portion 6b include a portion in which the thickness of the block gradually decreases. For example, as illustrated in FIG. 3(a), the reduced thickness portion 6b includes a portion that gradually decreases towards the plane B side from a block thickness $h_1$, which is the same thickness as the thickness $h_3$ of the block 5b, and that has a thickness $h_2$ such that $h_1 > h_2$ at a position where a step is formed.

Thus forming a portion in which the thickness of the block gradually decreases stepwise can ensure a volume of the grooves 4a and 4b equivalent to the amount of gradual reduction of the block. With this structure, mud drainage can be ensured even in the overlapping region where the blocks overlap in projection in the circumferential direction, i.e. even in the block portion that achieves traction performance.

The same structure and effects as above can also be obtained for the block 5a not illustrated in FIG. 3(a). Specifically, the reduced thickness portion 6a of the block 5a includes a portion that gradually decreases from the plane B side to the plane A side, and this gradually decreasing portion can increase groove volume and ensure mud drainage.

Note that in the structure of the example illustrated in FIG. 3(a), the reduced thickness portion 6b is included in a portion of the overlapping region R, yet a structure may be adopted wherein the entire block located in the overlapping region R constitutes the reduced thickness portion (for example, a structure in which the gradual decrease in the thickness of the block begins at a position in the plane A).

In this way, by providing the overlapping region where the blocks overlap in projection when viewed in the circumferential direction, a structure that increases the traction performance of the tire is achieved, and additionally, by providing the reduced thickness portion in which the block decreases or gradually decreases within the overlapping region, groove volume can be ensured, while also simultaneously improving mud drainage in the overlapping region. Furthermore, at this point, the good traction performance that is improved as above can be maintained while also ensuring good mud drainage without a loss of block rigidity due to decreasing the reduced thickness portion stepwise.

Next, FIGS. 3(b) and 3(c) are perspective views of two examples of the block 5b illustrated in FIG. 3(a).

As illustrated in FIGS. 3(b) and 3(c), the reduced thickness portion 6b includes a plurality of steps, the thickness of the block differing at each step. Here, from a groove bottom 7, a step $6b_1$ forms the first step, and a step $6b_2$ forms the second step.

In each of the steps $6b_1$ and $6b_2$, the length in the tire circumferential direction at the block interior, i.e. the length in the tire circumferential direction closer to the center of the block 5b, which has the block thickness $h_3$, is preferably greater than the length in tire circumferential direction at the block edge, i.e. the length in the tire circumferential direction of the block 5b at the groove bottom side, where the block thickness decreases or gradually decreases. To explain specifically with reference to FIG. 3(b), the length $x_1$ in the tire circumferential direction at the block interior of the step $6b_1$ is preferably greater than the length $x_2$ in the tire circumferential direction at the block edge, and the length $x_3$ in the tire circumferential direction at the block interior of the step $6b_2$ is preferably greater than the length $x_4$ in the tire circumferential direction at the block edge.

By adopting this structure, the block rigidity of the reduced thickness portion at the block interior can be increased and traction performance can be sufficiently achieved, while at the block edge, the block volume can be reduced to increase the groove volume, thereby sufficiently achieving mud drainage.

Note that the length in the tire circumferential direction at the beginning of the block $6b_2$ forming the second step need not be the same length as the block shoulder width $x_6$ of the block 5b having the block thickness $h_3$. As illustrated in FIG. 3(c), the length $x_5$ in the tire circumferential direction at the beginning of the block $6b_2$ forming the second step may be shorter than the block shoulder width $x_6$ of the block 5b having the block thickness $h_3$.

Furthermore, in the present invention, as illustrated in FIG. 3(a), in a step closest to the groove bottom 7 among the steps forming the reduced thickness portion in which the thickness of the block decreases stepwise, here the step $6b_1$ forming the first step from the groove bottom 7, a length $y_1$ in the tire width direction from a plane P, which traverses a tire width direction center of the overlapping region R and is parallel to the tire equator C, to an edge $p_1$ of the step $6b_1$ is preferably from 2% to 10% of the tread ground contact width, and more preferably from 3% to 5% of the tread ground contact width. The plane P is a plane traversing the tire width direction center between the plane A and the plane B, or in other words a center plane of the overlapping region R. The distance from this center plane P to the edge $p_1$ of the step $6b_1$ is preferably from 2% to 10% of the tread ground contact width, and more preferably from 3% to 5%. Here, the tread ground contact width TW refers to the distance in the tire width direction of the tread surface (between tread ground contact edges TE, TE).

In this way, when the length $y_1$ in the tire width direction of the first step $6b_1$ closest to the groove bottom 7 within the reduced thickness portion 6b of the block 5b is set to be from 2% to 10% of the tread ground contact width TW, the thickness of the step $6b_1$ is shallow, thus sufficiently ensuring groove volume, whereas the step $6b_1$ is long in the tire width direction, thus ensuring block volume and allowing for a high tire rigidity to be maintained. The reason for setting the length $y_1$ in the tire width direction to the above range is that a setting of 2% or more of the tread ground contact width TW yields a region with sufficient overlap when the circumferentially adjacent block 5a and block 5b are viewed in the circumferential direction and ensures sufficient traction performance. On the other hand, in a case such as that illustrated in FIG. 3(b), as the length $y_1$ in the tire width direction of the first step $6b_1$ increases, the length $x_2$ in the tire circumferential direction at the block edge of the step $6b_1$ tends to decrease, and therefore setting the length $y_1$ to be 10% or less of the tread ground contact width TW can ensure sufficient block rigidity at the tip of the step $6b_1$ while also ensuring groove volume and ensuring sufficient mud drainage.

By contrast, in the other step, here the step $6b_2$ forming the second step from the groove bottom 7, the length $y_2$ in the tire width direction from the plane P to the edge $p_2$ of the step $6b_2$ is preferably from 0.1% to 1% of the tread ground contact width TW.

Next, FIGS. 4(a) through 4(c) are modifications to the reduced thickness portion 6b illustrated in FIGS. 3(a) through 3(c). FIG. 4(a) illustrates the block 5b viewed in the tire circumferential direction, and FIGS. 4(b) and 4(c) are perspective views of two examples of the block 5b.

The reduced thickness portion 6b has a shape in which the thickness of the block decreases stepwise, as described in FIG. 3, yet in the modification illustrated in FIG. 4, among the plurality of steps forming the reduced thickness portion 6b that decreases stepwise, the step $6b_1$ closest to the groove bottom 7 has a curved surface convexly protruding from a tread surface side of the block 5 towards the groove bottom 7. Specifically, as illustrated in FIG. 4(a), the block $6b_1$ has a shape that gradually decreases while smoothly curving from a block shoulder portion 5s of the block 5b to the groove bottom 7, so as to protrude convexly towards the groove bottom 7.

By thus causing the block portion closest to the groove bottom 7 in the reduced thickness portion 6b to decrease gradually so as to protrude convexly towards the groove bottom, the block volume can be further reduced as compared to when the gradual decrease is planar from the block shoulder portion 5s to the groove bottom 7. In other words, as a result of increasing the groove volume, the mud drainage can be further improved. Furthermore, as compared to when the gradual decrease is planar from the block shoulder portion 5s to the groove bottom 7, mud more easily enters into and exits from the grooves, preventing mud from accumulating within the grooves and thereby allowing for mud on the road surface to be caught within the grooves continuously when the vehicle is driven. As a result, traction performance can also be improved.

In FIGS. 3(a) through 3(c) and FIGS. 4(a) through 4(c), to simplify explanation, only the reduced thickness portion 6b in the overlapping region R of the block 5b has been shown and described among the blocks 5a and 5b. As described above, however, the reduced thickness portion 6a is also provided in the overlapping region R in the block 5a, and the structure and effects thereof are the same as those of the block 5b and the reduced thickness portion 6b therein.

Furthermore, the plan view shape of the blocks 5a and 5b has been illustrated as a trapezoid, yet the plan view shape may be another shape, such as a rectangle, a square, or the like.

Note that when adopting any of the above structures, the negative ratio of the tire is preferably 50% or more. The reason is that during rough-road use, in particular when driving on muddy roads, foreign material such as mud or the like may accumulate in the grooves and block the grooves, and therefore it is necessary to ensure sufficient groove area.

EXAMPLES

Next, Inventive Example Tires 1 through 6 according to the present invention, a Conventional Tire according to a conventional technique, and a Comparative Example Tire were produced and driven on a muddy road, and both the mud drainage and traction performance of each tire were assessed.

The Inventive Example Tire 1 is a pneumatic tire with a size of 265/75R16 112Q and has an overlapping region where the blocks overlap in projection when viewed in the circumferential direction. In the overlapping region, the tire includes a reduced thickness portion including at least two portions that gradually decrease when viewed in the tire circumferential direction, as illustrated in FIG. 3(c). In this reduced thickness portion, the gradual decrease is planar. The length in the tire circumferential direction of the reduced thickness portion at the block interior is greater than that at the block edge. Specifications are as listed in FIG. 5.

The Inventive Example Tire 2 is the same as the Inventive Example Tire 1, except for being a pneumatic tire in which the reduced thickness portion decreases gradually in a convex shape protruding towards the bottom when viewed in the tire circumferential direction, as illustrated in FIG. 4(c). Specifications are as listed in FIG. 5.

The Inventive Example Tire 3 is the same as the Inventive Example Tire 1, except that the length in the tire circumferential direction of the reduced thickness portion is fixed from the block interior to the block edge. Specifications are as listed in FIG. 5.

The Inventive Example Tires 4 and 5 have the same structure as the Inventive Example Tire 1, except that the length $y_1$ in the tire width direction of the step closest to the groove bottom among the steps is 2% (Inventive Example Tire 4) or 6% (Inventive Example Tire 5) of the tread contact ground width TW.

The Conventional Example Tire is a pneumatic tire that has no region where the blocks overlap in projection when viewed in the tire circumferential direction and has no reduced thickness portion in which blocks gradually decrease towards the groove bottom. Specifications are as listed in FIG. 5.

The Comparative Example Tire is a pneumatic tire that has an overlapping region where the blocks overlap in projection when viewed in the circumferential direction, yet the reduced thickness portion does not include two or more portions that gradually decrease. Otherwise, the structure is the same as in the Inventive Example Tire 1. Specifications are as listed in FIG. 5.

Assessment of the traction performance of the tires having the specifications listed in FIG. 5 was performed by measuring the section time and slope section time on a dedicated muddy road course, converting the result into an index, and comparing the result with the Conventional Example Tire, which was set to a value of 100. The assessment of mud drainage for each tire was performed by measuring the groove volume. When the groove volume increases, the mud drainage can be considered to improve. Note that measurement was performed using a tire with an applicable rim width of 7.5 and internal pressure of 350 kPa, and with a four-passenger Mitsubishi L200 Strada for the vehicle.

The results in FIG. 5 show that the tire (Inventive Example Tire 1) having an overlapping region where the blocks overlap in projection when viewed in the circumferential direction and having, in the overlapping region, a reduced thickness portion including at least two portions that gradually decrease when viewed in the tire circumferential direction, as illustrated in FIG. 3, has an increased groove volume and improved mud drainage, as well as improved traction performance, as compared to the Conventional Example Tire. Furthermore, when the reduced thickness portion gradually decreases in a convex shape (Inventive Example Tire 2), the results show that the groove volume is further improved, and that traction performance also remarkably improves.

The results also show that when the length in the tire circumferential direction at the block interior of the reduced thickness portion is greater than the length in the tire circumferential direction at the block edge (Inventive Example Tire 1), the groove volume increases and mud drainage improves as compared to when the two lengths are the same (Inventive Example Tire 3).

INDUSTRIAL APPLICABILITY

According to the present invention, it is possible to provide a pneumatic tire that simultaneously achieves good mud drainage and good traction performance during rough-road use, in particular when driving on muddy roads.

REFERENCE SIGNS LIST

1: Tread surface
2, 3: Longitudinal Groove
4: Transverse Groove
5a, 5b: Block
L5: Block row
6a: Reduced thickness portion of block 5a
6b: Reduced thickness portion of block 5b $6b_1$: Step forming first step of reduced thickness portion $6b$ $6b_2$: Step forming second step of reduced thickness portion $6b$ 7: Groove bottom C: Equator R: Overlapping region TE: Tread edge

The invention claimed is:

1. A pneumatic tire comprising, on a tire tread surface, at least two longitudinal grooves extending along a tire equator, a plurality of transverse grooves connecting the longitudinal grooves, and a block row formed by a plurality of blocks extending along the tire equator and defined by the longitudinal grooves and the transverse grooves, wherein each block includes a reduced thickness portion in an overlapping region where the blocks overlap in projection when the block row is projected in a circumferential direction, the reduced thickness portion including at least two portions where a thickness of the block gradually decreases, and the reduced thickness portion comprises a plurality of steps, wherein an outermost step in a radial direction of the tire among the plurality of steps comprises an upper surface and two side surfaces adjacent the upper surface, the upper surface sloped with respect to the tire tread surface, the reduced thickness portion comprising the plurality of steps is formed step-wise so that a number of steps increases from a thinnest portion of the block to a thickest portion of the block from a block edge side toward a block interior side, a step closest to a groove bottom has a curved surface convexly protruding from a tread surface side of the block towards the groove bottom, the curved surface extending from the groove bottom to the tire tread surface, and the reduced thickness portion comprising the plurality of steps is formed step-wise so that the number of steps increases from a thinnest portion of the block to a thickest portion of the block in the tire circumferential direction, wherein the step closest to the groove bottom is on both sides of the outermost step in the tire circumferential direction.

2. The pneumatic tire according to claim 1, wherein in the reduced thickness portion comprising the plurality of steps, the thickness of the block differs at each step, and a step at a groove bottom of the longitudinal grooves or of the transverse grooves is a curved surface convexly protruding from a tread surface side of the block towards the groove bottom.

3. The pneumatic tire according to claim 1, wherein in the reduced thickness portion comprising the plurality of steps, the thickness of the block differs at each step, and in each step a length in a tire circumferential direction at a block interior is greater than a length in the tire circumferential direction at a block edge.

4. The pneumatic tire according to claim 1, wherein in the reduced thickness portion comprising the plurality of steps, the thickness of the block differs at each step, and in a step closest to the groove bottom among the steps, a length in a tire width direction from a plane to an edge of the step is from 2% to 10% of a tread ground contact width, the plane traversing a tire width direction center of the overlapping region and being parallel to the tire equator.

5. The pneumatic tire according to claim 1, wherein a length in the tire circumferential direction at an end of a block interior side of the outermost step is shorter than a width at an end of the outermost step side of a non-reduced thickness portion of the block.

6. The pneumatic tire according to claim 1, wherein the reduced thickness portion includes two steps, and a length in a tire width direction from a plane to an edge of the outermost step is from 0.1% to 1% of a tread ground contact width, the plane traversing a tire width direction center of the overlapping region and being parallel to the tire equator.

7. The pneumatic tire according to claim 1, wherein the blocks partially overlap in projection when the block row is projected in the circumferential direction.

8. The pneumatic tire according to claim 1, wherein a length in the tire circumferential direction at an edge of the block forming the outermost step is shorter than a length in the tire circumferential direction at a beginning of the block forming the step closest to the groove bottom.

* * * * *